United States Patent
Chamness et al.

(10) Patent No.: US 10,223,185 B2
(45) Date of Patent: Mar. 5, 2019

(54) AUTOMATED DEFECT DIAGNOSIS FROM MACHINE DIAGNOSTIC DATA

(71) Applicant: EMC Corporation, Hopkinton, MA (US)

(72) Inventors: Mark Chamness, Menlo Park, CA (US); Eric Schnegelberger, Youngsville, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 142 days.

(21) Appl. No.: 14/997,980

(22) Filed: Jan. 18, 2016

(65) Prior Publication Data

US 2016/0132377 A1    May 12, 2016

Related U.S. Application Data

(63) Continuation of application No. 14/042,491, filed on Sep. 30, 2013, now Pat. No. 9,274,874.

(51) Int. Cl.
  *G06F 11/07* (2006.01)
  *H04L 12/24* (2006.01)

(52) U.S. Cl.
  CPC ...... *G06F 11/0775* (2013.01); *G06F 11/0709* (2013.01); *G06F 11/0787* (2013.01); *G06F 11/0793* (2013.01); *H04L 41/06* (2013.01); *H04L 41/026* (2013.01)

(58) Field of Classification Search
  CPC ......... G06F 11/0766–11/0793; G06F 11/3636; G06F 11/366
  See application file for complete search history.

(56) References Cited

U.S. PATENT DOCUMENTS

| | | | |
|---|---|---|---|
| 5,928,369 A | 7/1999 | Keyser et al. | |
| 6,918,059 B1 | 7/2005 | Galuten et al. | |
| 7,877,642 B2 * | 1/2011 | Ding | G06F 11/3636 714/45 |
| 8,191,099 B2 * | 5/2012 | Johnson | G06F 11/0709 714/26 |
| 8,327,189 B1 * | 12/2012 | Glade | G06F 11/079 714/26 |
| 9,189,317 B1 * | 11/2015 | Marimuthu | G06F 11/366 |
| 2005/0278213 A1 | 12/2005 | Faihe | |
| 2006/0085785 A1 | 4/2006 | Garrett | |
| 2006/0184529 A1 | 8/2006 | Berg et al. | |
| 2007/0220036 A1 | 9/2007 | Das et al. | |
| 2008/0133208 A1 | 6/2008 | Stringham | |

(Continued)

OTHER PUBLICATIONS

Brodie, M.; Ma, S.; Lohman, G.; Mignet, L.; Wilding, M.; Champlin, J.; Sohn, P.; "Quickly Finding Known Software Problems via Automated Symptom Matching"; In Autonomic Computing, 2005 (ICAC 2005); Proceedings of the Second International Conference on Jun. 13, 2005; IEEE.*

*Primary Examiner* — Joseph R Kudirka
(74) *Attorney, Agent, or Firm* — Womble Bond Dickinson (US) LLP

(57) ABSTRACT

Diagnosis of defect(s) in a system is disclosed. A defect signature-based query is performed against system diagnostic data stored in one or more structured records. It is determined that a defect signature is associated with a system based at least in part on the query. Remediation information generated based at least in part on the defect signature and the system diagnostic data may be output.

19 Claims, 6 Drawing Sheets

(56) References Cited

U.S. PATENT DOCUMENTS

2008/0155091 A1\* 6/2008 Gokhale ............. G06F 11/0748
709/224
2009/0106363 A1 4/2009 Fallen et al.
2011/0296237 A1\* 12/2011 Mandagere ......... G06F 11/0727
714/15

\* cited by examiner

AUTOMATED DEFECT DIAGNOSIS FROM MACHINE DIAGNOSTIC DATA

CROSS REFERENCE TO OTHER APPLICATIONS

This application is a continuation of U.S. patent application Ser. No. 14/042,491, entitled AUTOMATED DEFECT DIAGNOSIS FROM MACHINE DIAGNOSTIC DATA filed Sep. 30, 2013, now U.S. Pat. No. 9,274,874, issued Mar. 1, 2016 which is incorporated herein by reference for all purposes.

BACKGROUND OF THE INVENTION

Technical support personnel typically spend a great deal of time manually reviewing system data to diagnose and resolve problems associated with a system. For example, a support engineer may receive a call from a customer regarding a defect in the customer's system. Often based on rough description of a defect from the customer, technical support personnel must manually search through system diagnostic data to identify defect symptoms. This process of manually searching through diagnostic data may be inefficient and costly for a technical support department.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Diagnostic methods and systems which automatically identify defects (e.g., bugs, software defects, misconfigurations, etc.) and other characteristics associated with a system (e.g., a serviced system, computing device, storage device) are disclosed herein. Such methods and systems may be useful for technical support personnel to efficiently diagnose defects in a system. In some embodiments, defect signature-based queries may be performed against structured records of system diagnostic data to determine whether a defect is associated with one or more systems. Upon determination that a defect is associated with a system, remediation approaches may be implemented to correct the defect.

Figure 1:
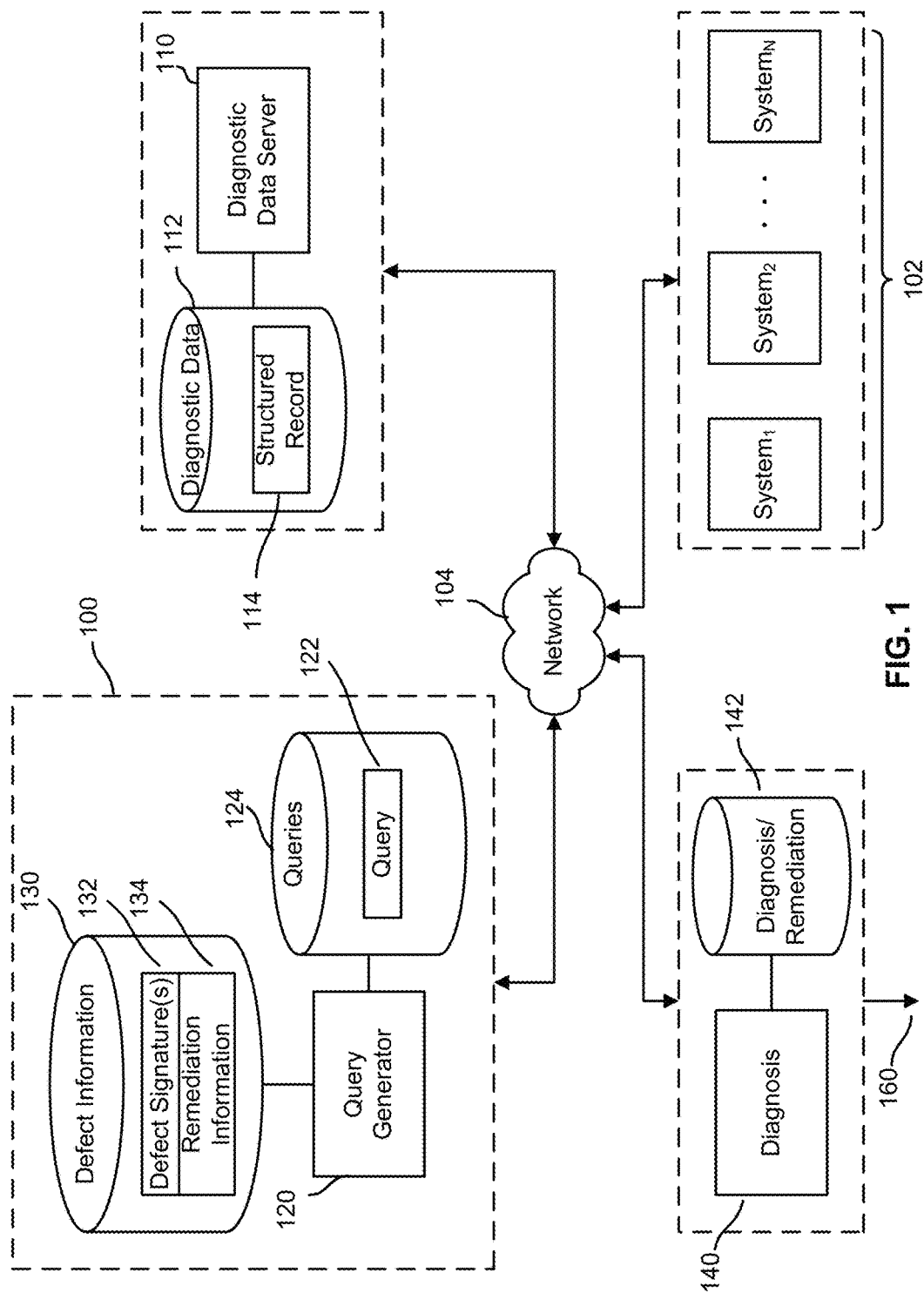
FIG. 1 is a diagram showing an automated support system for defect diagnosis.

FIG. 1 is a diagram showing an automated support system for defect diagnosis. An automated support system for defect diagnosis 100 may be associated with one or more systems 102 (e.g., serviced system(s), data storage system(s), Data Domain deduplication storage systems, back-up storage devices, servers, or any computer-related system). Systems 102 may communicate with system 100 via a network 104 (e.g., local area network, a wide area network, the Internet, or any appropriate communication network).

In some embodiments, system 100 may be associated with an organization's computer network (e.g., an enterprise computer network), and the systems 102 may include one or more devices managed within that organization. In other embodiments, system 100 may be associated with a system manufacturer (e.g., a data storage product manufacturer), and the systems 102 may include devices purchased from and supported by the system manufacturer. The system manufacturer may, for example, provide technical support to ensure optimal function of the systems 102.

One or more systems 102 (e.g., serviced systems, storage systems, servers, computing devices) may send system diagnostic data to system 100. The system diagnostic data may, for example, be received at system 100 (e.g., periodically, once a day). Any appropriate protocol may be used to transport the diagnostic data, including syslog, email message(s), Hypertext Transfer Protocol (HTTP), Hypertext Transfer Protocol Secure (HTTPS), or Simple Network Management Protocol (SNMP). In one example, the diagnostic data may include autosupport files (e.g. a document including diagnostic data for a system). Upon receipt, the diagnostic data may be parsed and otherwise processed by the diagnostic data server 110 to generate one or more structured records 114. The structured records 114 (e.g., structured diagnostic records) may be stored in a database of system diagnostic data 112 that includes diagnostic data associated with one or more systems 102.

In some embodiments, a query generator 120 may generate one or more defect signature-based queries 122 (e.g., defect-based queries). A query 122 may be generated based on a defect signature 132 (e.g., bug signature, health signature) associated with a defect and other parameters. A defect may include a bug (e.g., an undesirable condition related to a system), error, or other condition associated with a system that causes the system to deviate from a standard/optimal operation. Defect symptom data may include data that indicates the presence of a defect. Thus, the presence of defect symptom data in system diagnostic data may indicate that an associated defect is present and/or has manifested itself in a particular system 102 in which the defect symptom data is found to be present. Defect symptom data may include, for example, environmental measurements, component status, configuration settings, policy definitions, logs of system events (e.g., system failures), logs of system behavior (e.g., central processing unit (CPU) usage, input/output), and/or other information. A defect definition may include information used to characterize a specific defect. And, a defect signature 132 (e.g., a bug signature, health signature) may include defect symptom data which is associated with (e.g., matches, is representative of) a defect. In some cases, a defect signature 132 may include product(s) (e.g., software, hardware, devices) and code level(s) to which the defect is applicable or in which the defect is known to appear. A bug signature may include symptom data associated with a bug. A health signature may include system data representing normal or predicted operation of a system.

According to some embodiments, defect information 130 may be received (e.g., from an engineer, programmer, or other user) at system 100. The defect information 130 may be processed (e.g., parsed and otherwise processed) into one or more defect symptom records (e.g., collectively defect symptom data). The processed or structured defect symptom records may be stored in a database (e.g., a table, data structure, array, or index). Defect signatures 132 may be generated based at least in part on one or more defect symptom records (e.g., defect symptom data).

A defect signature-based query 122 may be generated based on one or more defect signatures 132 (e.g., by a query generator 120). Queries 122 may include functions (e.g., Structured Query Language (SQL) functions, PostgreSQL (PL/pgSQL) functions, or other functions executed in any suitable language) configured to query a given data set (e.g., a table, index, array, or other data structure) based on data associated with a defect signature 132 and, possibly, additional parameters. The data associated with a defect signature 132 may include, for example, defect symptom data (e.g., string(s) identifying defect symptoms), configuration parameters (e.g., software/hardware versions), and other data. Other parameters may include, for example, data associated with a system (e.g., a system identifier, serial number associated with a system), a time period (e.g., within one hour, over the last week, etc.), a frequency of occurrences during a window or period of time (e.g., ten times in one day), a domain and component associated with a system, and other suitable parameters. In one example, a defect signature-based query may include a regular expression (regexp), and defect signatures may be represented as regular expression patterns. In some embodiments, a query 122 may include logical operators (e.g., AND, OR, EITHER, IF, or any other logical operator). Logical operators may be used to, for example, combine defect symptoms, parameters associated with a system (e.g., a system identifier), and/or other parameters to generate a customized query. A query 122 may also include additional function calls (e.g., nested function(s)). Ultimately, a query 122 may be based on any combination of parameters, logical operators, techniques, and/or functions. In various embodiments, a query 122 invokes and makes use of a structure that has been imparted to diagnostic data in the course of generating structured records 114 based on received diagnostic data, to search for the presence of defect symptoms in an efficient and computationally feasible way.

According to some embodiments, a diagnostic engine 140 may be configured to perform queries 122 against system diagnostic data stored in one or more structured records 114. A diagnostic engine 140 may include an application for diagnosing defects (e.g., a web application for diagnosing defects). To perform a query, diagnostic engine 140 may communicate with a diagnostic data server 110 and query generator 120 via network 104. Diagnostic engine 140 may perform a defect signature-based query using a query 122 generated by the query generator 120. The query 122 may be based at least in part on a defect signature 132, data associated with a system (e.g., a system serial number), and other information. A query 122 may also be generated based on parameters received from diagnostic engine 140 (e.g., based on user input).

The defect signature-based query 122 may be performed against system diagnostic data stored in one or more structured records 114. In some embodiments, diagnostic engine 140 may communicate with diagnostic data server 110 to request system diagnostic data (e.g., structured records 114) for the query.

In some embodiments, it may be determined that a defect signature 132 is associated with a system based at least in part on the defect signature-based query 122. For example, in the event that the defect signature-based query 122 (e.g., based on defect symptoms, data associated with a system, and/or other parameters) results in a positive result (e.g., a match, hit, or correlation), it may be determined that a defect (e.g., associated with the defect signature) is associated with the system.

Upon a determination that the defect is associated with the system, diagnostic engine 140 and/or a device associated therewith, may output defect identification information 160. Defect identification information 160 may include details regarding the identification of the defect in the system diagnostic data 114.

In some embodiments, remediation information 134 may be generated based at least in part on the defect signature 132, system diagnostic data 112, and/or other information. Remediation information 134 may include, for example, steps to correct/remediate a defect, recommended software/hardware upgrades to correct the defect, a script to correct the defect (e.g., computer-executable instructions to remedy a defect (bug), a software patch), background information regarding the defect, and/or any other information related to the defect.

According to some embodiments, remediation information 134 may be associated with a defect signature 132. Remediation information 134, for example, may include an element of the defect signature 132, may be linked to a defect signature 132, or otherwise associated (e.g., via metadata) with a defect signature. In other embodiments, remediation information 134 may be generated based on a determination that the defect signature 132 is associated with a system 102. The remediation information 134 therefore may be based on the diagnosis or identification of defect symptoms in a particular set of system diagnostic data 112 independent of the defect signature.

Figure 2:
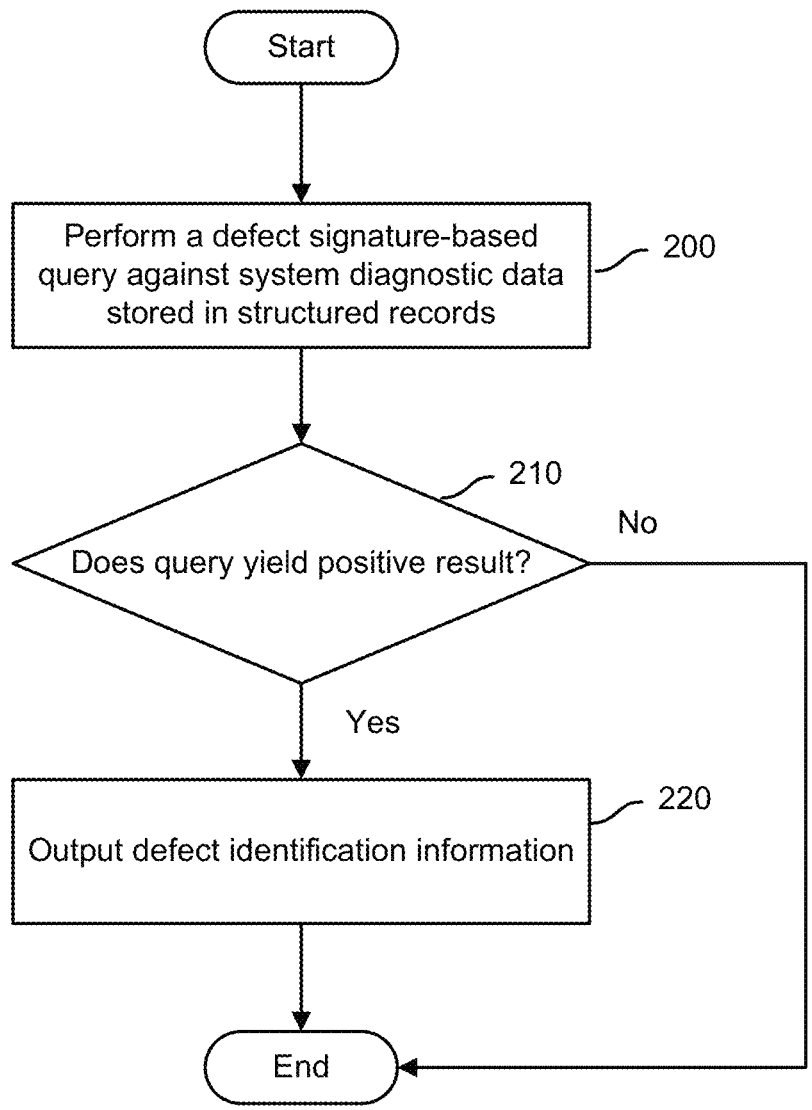
FIG. 2 is a flowchart illustrating embodiments of a process for defect diagnosis.

FIG. 2 is a flowchart illustrating embodiments of a process for defect diagnosis. In some embodiments, the process is performed by system 100 depicted in FIG. 1. At 200, a defect signature-based query is performed against system diagnostic data stored in one or more structured records. In various embodiments, a defect signature-based query may include a regular expression (regexp), and defect signatures may be represented as regular expression patterns. For example, a defect signature-based regular expression pattern may query for records including a text string (e.g., "test unit ready time out"). A default signature-based query may generated that includes parameters of a system serial number 123456, the regular expression pattern "test unit ready time out," a frequency parameter of two events per hour, and a time parameter of the last two months. The query may be performed against structured records of system diagnostic data (e.g., kernel log data) from the previous two months for system(s) associated with the serial number 123456. In the event that any of the structure records of system diagnostic data (e.g., kernel log data) include the text/string "test unit ready time out," execution of the query would generate a positive result. If the structured records of system diagnostic data do not include the text/string "test unit ready time out," execution of the query may not generate a positive result.

In some embodiments, defect signature-based query may be based on a health signature. A health signature may include information associated with normal or optimal operation of a system. A health signature-based query may be performed against system diagnostic data to identify conditions (e.g., CPU usage, temperature, input/output rates) that are not compliant with a health signature defining optimal or normal system operation. A health signature-based query may be used to diagnose or identify system defects or conditions not yet documented as defects (e.g., bugs or bug signatures). A health signature-based query may be used to identify outlier system(s) (e.g., system(s) with characteristics that deviate from optimal/normal operation).

At 210, it is determined whether the query yields a positive result (e.g., a match, correlation, hit). In some cases, a default signature-based query against system diagnostic data may not yield a positive result, and the process would terminate. In this case, an indication may be output that no defects were discovered as a result of the default signature-based query. An output may also identify one or more structured records (or portions thereof) that resemble, but do not fully match, the default signature-based query.

Alternatively, a default signature-based query against system diagnostic data may result in a match, correlation, or positive result. For example, one or more of the structured records of system diagnostic data may include information matching, associated with, or corresponding to the default signature-based query parameters. And, execution of a defect signature-based query may identify defect symptoms associated with a defect signature in the structured records of system diagnostic data.

At 220, upon a determination that the defect is associated with the system, diagnostic engine and/or a device associated therewith, may output defect identification information. The defect identification information may be used by engineers or programmers to gain deeper understanding regarding the defect. In some embodiments, defect identification information may include a portion of the system diagnostic data that includes symptoms of the defect. By way of example, if a default signature-based query identifies an element of a defect signature (e.g., a defect symptom) in a line of kernel log data from a system, the line of kernel log data or an identifier thereof may be output. In some embodiments, the defect identification information output may include a defect identifier (e.g., a serial number associated with the defect or defect signature). Alternatively, defect identification information may include a summary of the defect. A defect summary may include background information regarding a defect associated with the defect signature. The defect summary may include hardware/software versions associated with the defect, a number of occurrences of defect symptoms (e.g., in the system or a group of systems), time(s) of occurrences of defect symptoms, root cause(s) associated with a defect, and other information associated with the defect.

According to some embodiments, it may be determined that a defect signature is associated with a system. Whether a defect signature is associated with a system may be determined based at least in part on whether the results of the defect signature-based query of step 210 yields a positive result. A defect signature-based query against system diagnostic data producing a positive result (e.g., a match) may indicate that symptoms associated with a defect are present in the system. For example, if a defect signature-based query of kernel log data identifies an instance of a defect symptom (e.g., a string representing the symptom), it may indicate that a defect signature including the defect symptom is associated with the system.

According to some embodiments, it may be determined that a defect signature is not associated with a system even though the results of the defect signature-based query of step 210 yields a positive result. For example, a defect signature-based query may in some instances yield a false positive. In this case, the defect signature (e.g., defect definition) may be modified, redefined, and/or altered to add or remove parameters. The defect signature may, for example, be modified to add additional qualifiers (e.g., defect symptoms and/or other parameters).

In some embodiments, it may be determined that the system is not compliant with a health signature. For example, if a health signature-based query of system diagnostic data indicates that performance of a system component is sub-optimal, it may be determined that the system is not compliant with a health signature associated with that system component.

Figure 3:
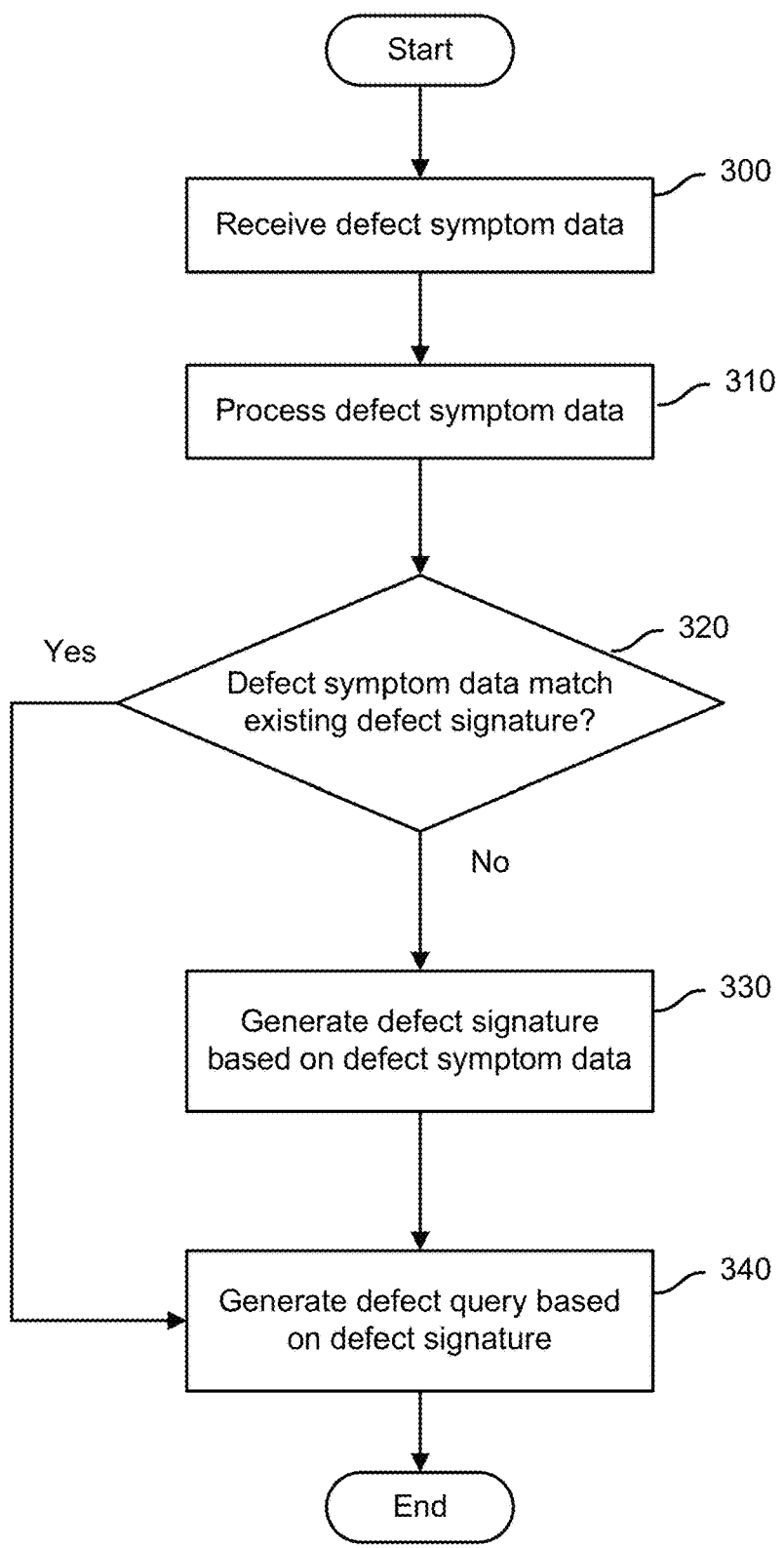
FIG. 3 is a flowchart illustrating embodiments of a process for generating defect signatures.

FIG. 3 is a flowchart illustrating embodiments of a process for generating defect signatures. In some embodiments, the process is performed by system 100 depicted in FIG. 1. At 300, defect symptom data is received (e.g., from an engineer, programmer, or other user) at, for example, system 100 in FIG. 1.

At 310, the defect symptom data may be processed (e.g., parsed and otherwise processed) into one or more defect symptom records (e.g., collectively defect symptom data). The defect symptom records may be stored in a data structure (e.g., a table, index, array, data object) stored in a database.

At 320, it is determined whether the received defect symptoms match an existing defect signature. For example, a query based on the received defect symptom(s) may be performed against one or more defect signatures (e.g., stored in structured defect signature records). In the event that defect symptom(s) match one or more of the defect signatures, the process may proceed to step 340 (discussed below). In the event that defect symptom(s) do not match one or more of the defect signatures, a new defect signature may be generated.

At 330, a defect signature 330 is generated based at least in part on one or more defect symptom records (e.g., defect symptom data). For example, the defect signature may be generated to include the one or more defect symptom records.

At 340, a defect signature-based query is generated based at least in part on the defect signature. The defect signature-based query may be based on any combination of defect-related parameters (e.g., defect symptoms), logical operators, techniques, and/or functions.

Figure 4:
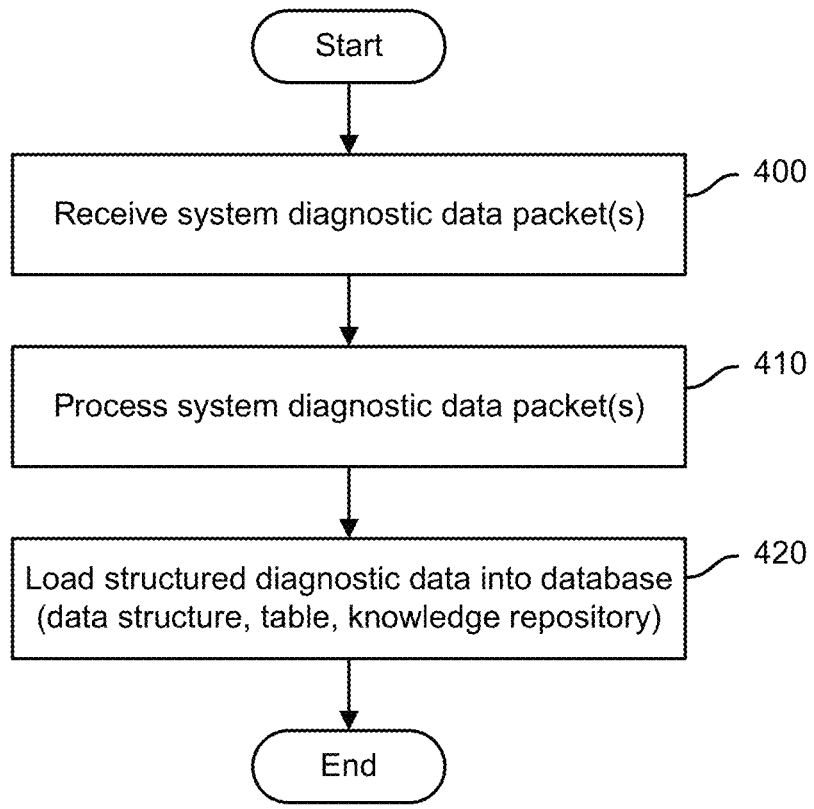
FIG. 4 is a flowchart illustrating embodiments of a process for processing system diagnostic data.

FIG. 4 is a flowchart illustrating embodiments of a process for processing system diagnostic data. In some embodiments, the process is performed by system 100 depicted in FIG. 1. At 400, system diagnostic data (e.g., system log data, configuration data, registry data, telemetry data, autosupport data) are periodically received at system (e.g., once a day).

At 410, diagnostic data may be parsed and/or otherwise processed by the diagnostic data server to generate one or more structured records. In one example, the system diagnostic data may include a wide-variety of information related to the system (e.g., including extraneous information), and this information may be parsed and filtered to extract relevant system diagnostic data. This data may be converted into structured records of system diagnostic data.

At 420, the structured records (e.g., structured diagnostic records) may be stored in a database of system diagnostic data that includes diagnostic data from one or more systems (e.g., a group of systems).

Figure 5:
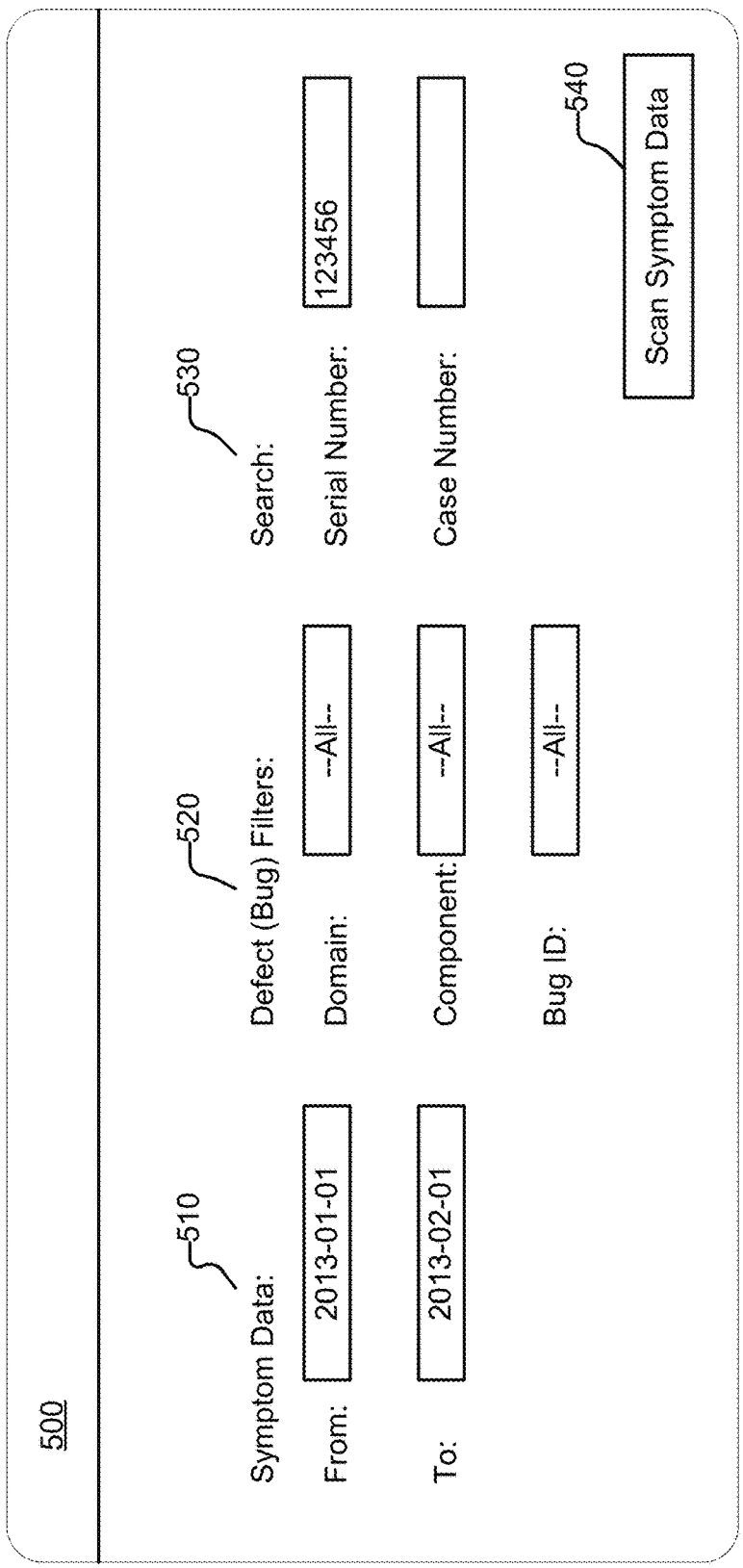
FIG. 5 is a diagram depicting an example interface for defect diagnosis.

FIG. 5 is a diagram depicting an example interface for defect diagnosis. A defect diagnosis interface 500 allows a user to enter defect symptom data, defect filters, search information, and other data. For example, a user may enter a date range into symptom data entry fields 510, select defect filters 520 (e.g., domain, component, defect ID and other filters (not shown)), and/or enter additional criteria (e.g., serial number of a system) into search data entry fields 530. A defect signature-based query may be generated based on the entered information and the query may be executed upon receipt of input from the scan symptom data button 540. The interface 500 is one example of an interface; the present disclosure, however, encompasses a wide-variety of interface configurations.

Figure 6:
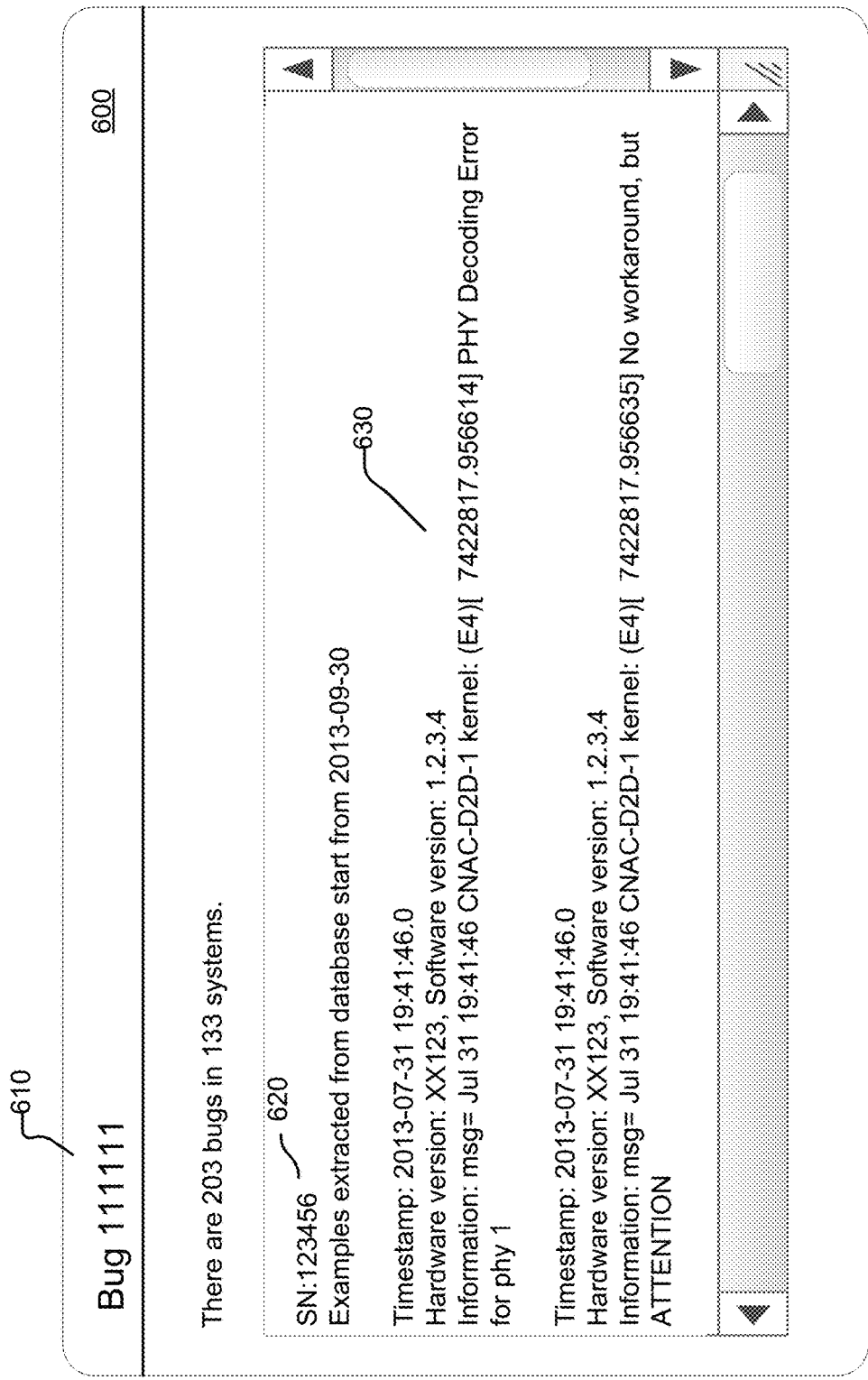
FIG. 6 is a diagram depicting an example interface for displaying defect diagnosis results.

FIG. 6 is a diagram depicting an example interface for displaying defect diagnosis results. A defect diagnosis display interface 600 may output defect identification information including a defect identifier 610 (e.g., a bug ID), data identifying a system 620, a defect symptom summary 630 (e.g., including a timestamp, hardware/software version(s), a portion of the system diagnostic data in which the defect symptoms are identified), and other information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method of generating defect signatures for detecting defects of storage systems, the method comprising:
   receiving at a storage automated support system defect symptom data from a plurality of defect symptom data sources, wherein the defect symptom data includes a data pattern representing a particular defect occurring in a storage system, and wherein the defect symptom data is associated with data identifying the storage system;
   processing, by a processor of the storage automated support system, the received defect symptom data into one or more defect symptom records;
   determining whether the received defect symptom data is associated with an existing defect signature; and
   in the event the received defect symptom data is not associated with an existing defect signature:
   generating, by the processor of the storage automated support system, a new defect signature, wherein the new defect signature is utilized to generate a defect signature-based query usable in determining whether subsequent diagnosis data of the storage system contains a defect;
   determining whether the defect signature-based query yields a false positive when used in the determining of whether the subsequent diagnosis data of the storage system contains a defect;
   in response to the determined false positive, modifying the new defect signature by adding additional qualifiers and storing the modified new defect signature; and
   generating remediation information associated with the new defect signature, the remediation information comprising a script executed to correct a defect.

2. The method of claim 1, further comprising:
   receiving particular defect symptom data from one or more systems associated with one or more users.

3. The method of claim 2, wherein the particular defect symptom data includes data that indicates the presence of a defect.

4. The method of claim 2, wherein the particular defect symptom data includes one or more of environmental measurements, component status, configuration settings, policy definitions, logs of system events, or logs of system behavior.

5. The method of claim 1, further comprising:
   in the event the received defect symptom data is associated with an existing defect signature, generating a defect signature-based query based at least in part on the existing defect signature.

6. The method of claim 5, wherein the defect signature-based query is based at least in part on one or more of: defect-related parameters, logical operators, techniques, or functions.

7. The method of claim 5, wherein the defect signature-based query is performed at least in part using one or more stored structured records.

8. The method of claim 1, wherein generating a new defect signature is based at least in part on one or more defect symptom records.

9. The method of claim 1, wherein the existing defect signature comprises a bug signature.

10. The method of claim 1, wherein the existing defect signature comprises a health signature.

11. A system for defect diagnosis, comprising:
    a processor; and
    a memory coupled with the processor, wherein the memory is configured to provide the processor with instructions which when executed cause the processor to:
    receive defect symptom data having a data pattern representing a particular defect occurring in a storage system, wherein the defect symptom data is associated with data identifying the storage system;
    process the received defect symptom data into one or more defect symptom records;
    determine whether the received defect symptom data is associated with an existing defect signature; and
    in the event the received defect symptom data is not associated with an existing defect signature:
    generate a new defect signature, wherein the new defect signature is utilized to generate a defect signature-based query usable in determining whether subsequent diagnosis data of the storage system contains a defect;

determine whether the defect signature-based query yields a false positive when used in the determining of whether the subsequent diagnosis data of the storage system contains a defect;

in response to the determined false positive, modify the new defect signature by adding additional qualifiers and store the modified new defect signature; and generate remediation information associated with the new defect signature, the remediation information comprising a script executed to correct a defect.

12. The system of claim 11, wherein the memory is further configured to provide the processor with instructions which when executed cause the processor to:

receive particular defect symptom data from one or more systems associated with one or more users.

13. The system of claim 12, wherein the particular defect symptom data includes data that indicates the presence of a defect.

14. The system of claim 12, wherein the particular defect symptom data includes one or more of environmental measurements, component status, configuration settings, policy definitions, logs of system events, or logs of system behavior.

15. The system of claim 11, wherein the memory is further configured to provide the processor with instructions which when executed cause the processor to:

in the event the received defect symptom data is associated with an existing defect signature, generate a defect signature-based query based at least in part on the existing defect signature.

16. The system of claim 15, wherein the defect signature-based query is performed at least in part using one or more stored structured records.

17. A computer program product for defect diagnosis, the computer program product being embodied in a tangible non-transitory computer readable storage medium and comprising computer instructions for:

receiving defect symptom data having a data pattern representing a particular defect occurring in a storage system, wherein the defect symptom data is associated with data identifying the storage system;

processing received defect symptom data into one or more defect symptom records;

determining whether the received defect symptom data is associated with an existing defect signature; and in the event the received defect symptom data is not associated with an existing defect signature:

generating, by a processor, a new defect signature, wherein the new defect signature is utilized to generate a defect signature-based query usable in determining whether subsequent diagnosis data of the storage system contains a defect;

determining whether the defect signature-based query yields a false positive when used in the determining of whether the subsequent diagnosis data of the storage system contains a defect;

in response to the determined false positive, modifying the new defect signature by adding additional qualifiers and storing the modified new defect signature; and generating remediation information associated with the new defect signature, the remediation information comprising a script executed to correct a defect.

18. The computer program product of claim 17, further comprising:

receiving particular defect symptom data from one or more systems associated with one or more users.

19. The computer program product of claim 18, further comprising:

in the event the received particular defect symptom data is associated with an existing defect signature, generating a defect signature-based query based at least in part on the existing defect signature.

* * * * *